United States Patent [19]

Steinberg

[11] 4,411,861
[45] Oct. 25, 1983

[54] METHOD FOR PROTECTING THE CASING TUBES OF NUCLEAR REACTOR FUEL RODS

[75] Inventor: Eckard Steinberg, Erlangen, Fed. Rep. of Germany

[73] Assignee: Kraftwerk Union Aktiengesellschaft, Mülheim an der Ruhr, Fed. Rep. of Germany

[21] Appl. No.: 250,047

[22] Filed: Apr. 1, 1981

Related U.S. Application Data

[63] Continuation of Ser. No. 934,358, Aug. 17, 1978, abandoned.

[30] Foreign Application Priority Data

Aug. 19, 1977 [DE] Fed. Rep. of Germany ....... 2737532

[51] Int. Cl.³ ............................................. G21C 3/06
[52] U.S. Cl. .................................... 376/417; 148/6.3; 427/237
[58] Field of Search ............... 376/414, 416–418; 148/6.3, 11.5 F; 427/237–239

[56] References Cited

U.S. PATENT DOCUMENTS

| | | | |
|---|---|---|---|
| 2,974,075 | 3/1961 | Miller | 148/6.3 |
| 2,987,352 | 6/1961 | Watson | 148/6.3 |
| 3,291,700 | 12/1966 | Brossa et al. | 176/82 |
| 3,556,870 | 9/1967 | DeBray et al. | 148/6.3 |
| 3,677,894 | 7/1972 | Ferrari | 176/68 |
| 3,796,592 | 3/1974 | Cohen et al. | 407/237 |
| 3,887,740 | 6/1975 | Foster et al. | 407/238 |
| 3,911,194 | 10/1975 | DeJochy et al. | 427/237 |
| 3,969,186 | 7/1976 | Thompson et al. | 176/68 |
| 3,993,453 | 11/1976 | Ross et al. | 176/68 |
| 4,071,587 | 1/1978 | Eggers | 264/0.5 |

FOREIGN PATENT DOCUMENTS

| | | | |
|---|---|---|---|
| 2445564 | 1/1976 | Fed. Rep. of Germany | 427/237 |
| 1295251 | 11/1972 | United Kingdom | 176/82 |
| 1367184 | 9/1974 | United Kingdom | 176/82 |

*Primary Examiner*—Harvey E. Behrend
*Attorney, Agent, or Firm*—Herbert L. Lerner; Laurence A. Greenberg

[57] ABSTRACT

Method of protecting a zirconium-alloy cladding tube of a nuclear-reactor fuel rod against attack by radioactive fission products, such as iodine especially, which includes applying an internal pressure to the cladding tube at a temperature of from 300° to 500° C. so as to deform the cladding tube, depending upon the geometric dimensioning thereof, in the elastic range and up to nearly the yield point thereof and, while this condition exists, reacting a medium previously introduced into the interior of the cladding tube, with the inner surface of the cladding tube to form a protective layer.

9 Claims, 5 Drawing Figures

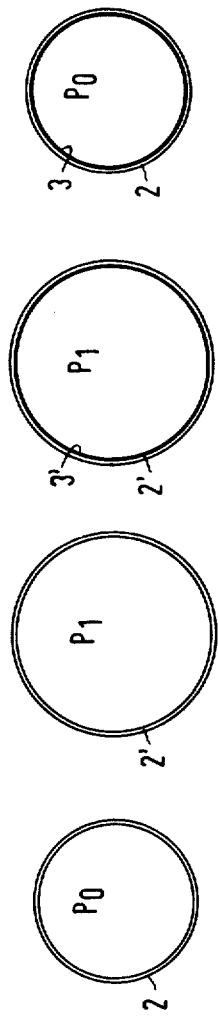
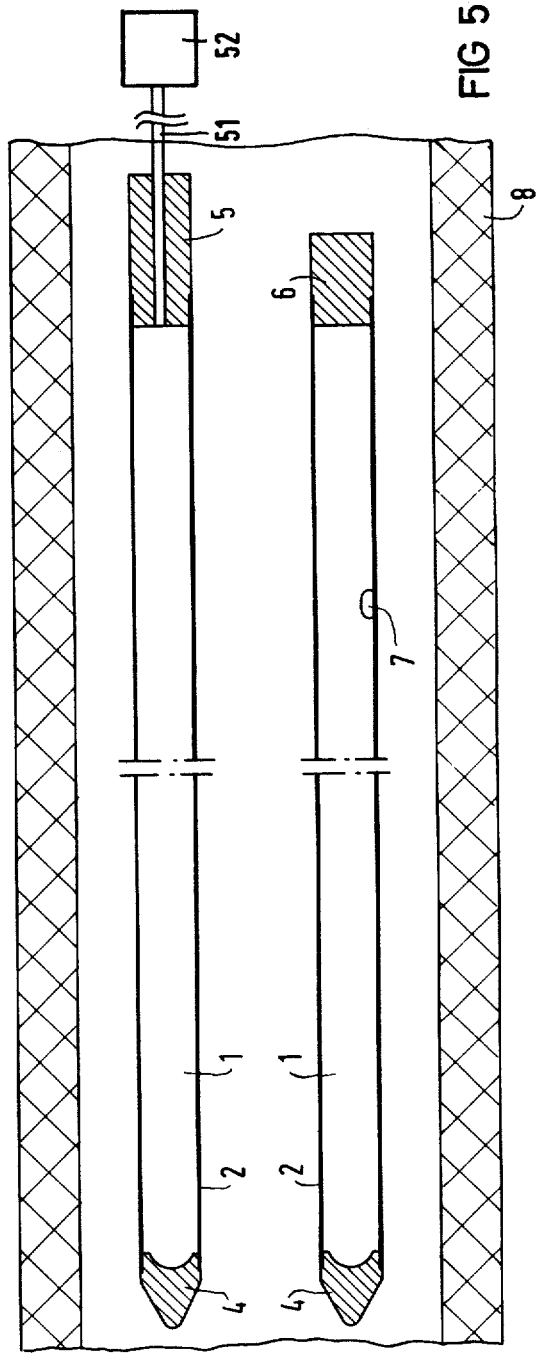

METHOD FOR PROTECTING THE CASING TUBES OF NUCLEAR REACTOR FUEL RODS

This is a continuation, of application Ser. No. 934,358, filed Aug. 17, 1978 now abandoned.

The invention of the instant application relates to a method for protecting the casing or cladding tubes of nuclear reactor fuel rods, which are formed of zirconium alloy, against the attack of radioactive fission products, such as iodine, especially. The fuel rods, especially of light-water reactors, are formed of a cladding or casing tube to which end caps have been welded at both ends thereof, and a charge of generally pellet-shaped nuclear fuel, such as uranium dioxide or a mixture of uranium dioxide and plutonium dioxide, for example. The wall thickness of the cladding tubes is about 0.3 to 0.7 mm. The operating temperature in the nuclear reactor is in the order of 400° C., but this temperature can be exceeded for short periods of time in the event of accidents. Operating experience with such nuclear reactor fuel rods over many intervening years has shown that presently employed fuel rod constructions have a high degree of reliability. Occurrence of damage to nuclear reactor fuel rods has been rare and has required in most cases no immediate interruption of the operation of the respective nuclear reactor. This experience prevailed especially for such nuclear reactors which were operated with uniform load.

It was found, however, that more fuel rod defects occurred when nuclear reactors had to be operated with varying load. This varying load resulted in varying temperatures of the nuclear reactor fuel rods, which were consequently also stressed cyclically, in addition, by thermal expansion. It was accordingly found that stress-crack corrosion set in at the inner wall surface of the cladding tubes, radioactive fission products, especially iodine, being found to be the corroding media.

The problem therefore arose of finding ways and means to prevent such stress-crack corrosion to the greatest extent possible and, thereby, to make the fuel rods as reliable under varying-load operation as under constant load.

It is accordingly an object of the invention to provide a method of protecting the casing or cladding tubes of nuclear reactor fuel rods from such stress-crack corrosion and for, thereby, rendering the fuel rods equally reliable under varying-load as well as constant-load operation.

With the foregoing and other objects in view, there is provided, in accordance with the invention, a method of protecting a zirconium-alloy cladding tube of a nuclear-reactor fuel rod against attack by radioactive fission products, such as iodine especially, which comprises applying an internal pressure to the cladding tube at a temperature of 300° to 500° C. so as to deform the cladding tube, depending upon the geometric dimensioning thereof, in the elastic range and up to nearly the yield point thereof and, while this condition exists, reacting a medium previously introduced into the interior of the cladding tube with the inner surface of the cladding tube to form a protective layer. At the end of the empirically determinable time for the formation of the protective layer, the temperature and the pressure are lowered again so that the cladding tube resumes virtually the original dimensions thereof. The protective layer produced during this treatment is thereby compressed and is under great internal compressive stress. This stress does not also disappear during operation of the reactor because in the course thereof, a similar cladding-tube deformation cannot occur due to the externally applied high pressure of the coolant. It has now been found that cladding tubes of nuclear fuel rods treated in this manner have become virtually insensitive to stress-crack corrosion. This also corresponds to experience obtained in other fields of engineering with work pieces which were provided with an internal compressive stress zone as protection against stress-crack corrosion. In this connection, reference may be had to heat exchanger tubes which are provided on the outside thereof with a compressive stress layer by rolling or blasting with glass beads.

In accordance with another measure of the method of the invention, the cladding tube is closed at both ends thereof, and the introduced medium serves simultaneously for applying the internal pressure thereto.

In accordance with a further measure of the method invention, a given quantity of water serves as the introduced medium, the vapor thereof forming a protective layer of zirconium dioxide on the inner surface of the cladding tube.

In accordance with an added measure of the method invention, a given quantity of $H_2O_2$ serves as the introduced medium, the vapor thereof and liberated atomic oxygen forming a protective layer of zirconium dioxide on the inner surface of the cladding tube.

In accordance with an additional measure of the invention, the method includes welding a plug beforehand to one open end of an open-ended tube so as to seal the respective open end thereof, thereafter introducing the given quantity of medium into the tube thus sealed at the one end thereof, temporarily closing off the other open end of the tube, then heating the tube to vaporize the medium that has been introduced therein and so as to cause it to react with the inner surface of the cladding tube, opening the temporarily closed other end of the tube after an empirically determined time period during which the protective layer is formed, and cooling the cladding tube.

In accordance with yet another measure of the method invention, the medium is formed at least partly of a respective substance for increasing the internal pressure in the cladding tube and for forming the protective layer.

In accordance with yet a further measure of the method invention, the substances are gaseous.

In accordance with an alternate measure of the method invention, the substances are gas-forming.

In accordance with a concomitant feature of the invention, the method includes filling the cladding tube sealed at the respective one end thereof with nuclear-fuel pellets, and sealing the other end of the cladding tube to form the fuel rod.

Other features which are considered as characteristic for the invention are set forth in the appended claims.

Although the invention is illustrated and described herein as embodied in a method for protecting the casing tubes of nuclear reactor fuel rods, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which:

FIG. 1 is an end view of a fuel rod cladding tube before it is subjected to the method according to the invention;

FIGS. 2 to 4 are views similar to that of FIG. 1 during different successive stages of the method invention, namely, after expansion of the tube, application of a protectve layer to the inner surface thereof and after restoration of the tube to the original shape thereof, respectively; and FIG. 5 is a diagrammatic view of apparatus for carrying out two different modes of the method of the invention.

Referring now to the drawing and first, particularly, to FIG. 1 thereof, there is shown a fuel rod cladding tube 2 in an end view before the method according to the invention is performed. In the interior of the tube 2, a pressure $P_o$ prevails, which also corresponds to external pressure.

FIG. 2 shows that through application of a high internal pressure $P_1$ as well as of a temperature of 300° to 500° C., an enlargement or widening of the cladding tubes has occurred. In this expanded cladding tube 2, the deformation of which has been effected, while yet in the elastic range or region, nearly to the yield point, a protective layer 3 is formed by an introduced medium. This condition is shown in FIG. 3. After this protective layer 3 has been formed, and pressure and temperature have been reduced, the fuel rod cladding tube 2 returns to its original shape according to FIG. 4, the protective layer 3' formed in the interior thereof being compressed i.e. being stressed in compression. The diameter increase shown in the figure is, obviously, not to scale, but rather, has been greatly exaggerated in order to illustrate the principle of the invention.

FIG. 5 illustrates two possibilities for performing the method practically. The fuel rod cladding tubes 1 are tightly welded at the one end thereof to a conventional end plug 4. The tubes 1, at the other end thereof, are welded to a provisional or temporary end plug 5 which is connected to a pressurized-gas source 52 through a line 51. To heat such a fuel rod uniformly, it is placed in a furnace 8, indicated only diagrammatically in FIG. 5, for carrying out the method. Another heat source, such as inductive heating, could obviously also be used for this purpose. To apply the required high internal pressure for producing the elastic expansion which, for conventional dimensions of a fuel rod cladding tube, is more than 100 bar, pressure gas, such as nitrogen, for example, is delivered through the line 51. This gas additionally contains a given amount of the substance forming the protective layer, such as oxygen, for example. With this entrained oxygen, the inside wall surface of the cladding tube is oxidized and $ZrO_2$ is formed. The same effect is also obtained through the application of high-pressure steam. The mechanism for forming the protective layer corresponds to that known heretofore from the technology of the autoclaving of zirconium cladding tubes. In the latter process, however, the cladding tube per se is not stressed mechanically, so that the protective layers formed thereon show no internal residual stresses.

Another elegant procedure for performing the method of the invention is shown in FIG. 5 in regard to the lower cladding tube 1 illustrated therein. The latter tube 1 is disposed in the same furnace 8 and is closed by a provisional or temporary end plug 6. The end plug 6 is absolutely tight, no connection being provided to any source of pressurized gas. Before the temporary plug 6 was inserted, however, a given amount of water (note the drop 7) was introduced into the lower cladding tube 1 shown in FIG. 5. The amount of water in the drop 7 was determined as the amount which will produce the internal pressure required for the elastic deformation at the temperature provided by the furnace.

Instead of the drop of water 7, a corresponding amount of hydrogen peroxide could also be used. When the latter evaporates, atomic oxygen is produced which causes the inner wall surface of the cladding tube to oxidize more rapidly than has been possible by any of the methods mentioned hereinbefore.

Instead of liquids, other gas-yielding or generating substances can, of course, also be introduced, it being important that these substances be able to be reliably metered.

The excellent protective action against stress-crack corrosion achieved by this method invention is explainable not only by the compressive-stress layer but also by the procedure due to which the protective layer is applied to the widened or expanded cladding tube. This protective layer is formed also, for example, in gaps between the end plugs and the open cladding tubes, as well as at the boundary of the welded seam connecting them one to the other. The same thing applied as well to surface defects which can stem from the process of manufacturing the open-ended cladding tubes per se. As compared to the normal autoclave technology, a complete coating or layer is thus produced which extends into the microscopic range and has a thickness of up to 5 μm advantageiously.

A further advantage connected with this method invention ought not to be omitted. This is that while this method is being performed, a possibility is simultaneously provided for checking the tightness of the welding seam between the end plug 4 and the previously open-ended cladding tube 2. This can be accomplished if the interior of the furnace 8 is tightly closed off, and the pressure therein is monitored. It should also be noted that this method according to the invention extends not only to the formation of oxide layers, but that, carbide and silicide layers and the like could also be utilized to achieve stress-crack corrosion resistance. The choice of the most suitable protective layers depends upon the selection of the cladding tube material, which may well always be a zirconium alloy, as well as upon the specification of the nuclear fuel.

It should be further noted that it is also possible to apply this method invention to previously completed nuclear fuel rods i.e. fuel rods already containing their nuclear fuel charge. In that case, the oxidant, for example, must be introduced before the open-ended cladding tube is finally closed off. This oxidant can be of such composition then as to provide simultaneously for the so-called initial internal pressure of the nuclear reactor fuel rod during the operation of the fuel rod.

I claim:

1. Method for protecting a zirconium-alloy cladding tube of a nuclear-reactor fuel rod against attack by radioactive fission products, such as iodine especially, which comprises applying an excess pressure to the interior of the cladding tube above the pressure existing outside the cladding tube at a temperature of from 300° to 500° C. so as to widen the cladding tube, depending upon the geometric dimensioning thereof, in the elastic range and up to nearly the yield point thereof beyond the normal expansion during reactor operation, while this condition exists, reacting a medium previously introduced into the interior of the cladding tube with the inner surface of the cladding tube to form a protective layer, and thereafter reducing the temperature and excess pressure so that the cladding tube returns to its original shape.

2. Method according to claim 1 wherein the cladding tube is closed at both ends thereof, and the introduced medium is vaporized for generating a gas with the excess pressure.

3. Method according to claim 1 wherein a given quantity of water serves as the introduced medium, the vapor thereof forming a protective layer of zirconium dioxide on the inner surface of the cladding tube.

4. Method according to claim 1 wherein a given quantity of $H_2O_2$ serves as the introduced medium, the vapor thereof and liberated atomic oxygen forming a protective layer of zirconium dioxide on the inner surface of the cladding tube.

5. Method according to claim 1 which comprises welding a plug beforehand to one open end of an open-ended tube so as to seal the respective open end thereof, thereafter introducing the given quantity of medium into the tube thus sealed at the one end thereof, temporarily closing off the other open end of the tube, then heating the tube to vaporize the medium that has been introduced therein and so as to cause it to react with the inner surface of the cladding tube, opening the temporarily closed other end of the tube after an empirically determined time period during which the protective layer is formed, and cooling the cladding tube.

6. Method according to claim 1 wherein the medium is formed at least partly of respective substances for generating gas with the excess pressure within the interior of the cladding tube and for forming the protective layer.

7. Method according to claim 6 wherein said substances are gaseous.

8. Method according to claim 6 wherein said substances are gas-forming.

9. Method according to claim 5 which comprises filling the cladding tube sealed at the respective one end thereof with nuclear-fuel pellets, and sealing the other end of the cladding tube to form the fuel rod.

* * * * *